US008375422B2

(12) United States Patent
Sennett et al.

(10) Patent No.: US 8,375,422 B2
(45) Date of Patent: Feb. 12, 2013

(54) REMOTE DISABLEMENT OF A COMMUNICATION DEVICE

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 729 days.

(21) Appl. No.: 12/053,326

(22) Filed: Mar. 21, 2008

(65) Prior Publication Data
US 2009/0241172 A1 Sep. 24, 2009

(51) Int. Cl.
H04L 29/06 (2006.01)

(52) U.S. Cl. ............... 726/4; 726/26; 726/27; 713/168; 455/410; 455/411

(58) Field of Classification Search .................. 713/100, 713/158, 164, 168, 182, 183, 300, 310; 726/4, 726/5, 6, 7, 21, 26, 27, 28, 33, 34, 35, 36; 380/247, 249, 250, 270, 273; 455/404.1, 455/410, 411, 419, 420, 70
See application file for complete search history.

(56) References Cited

U.S. PATENT DOCUMENTS

| | | | | | |
|---|---|---|---|---|---|
| 5,465,387 | A | * | 11/1995 | Mukherjee | 455/26.1 |
| 5,600,708 | A | * | 2/1997 | Meche et al. | 455/411 |
| 5,659,595 | A | * | 8/1997 | Chanu et al. | 455/411 |
| 5,991,617 | A | * | 11/1999 | Powell | 455/410 |
| 6,542,730 | B1 | * | 4/2003 | Hosain | 455/410 |
| 6,895,223 | B2 | * | 5/2005 | Murakami | 455/67.11 |
| 7,107,349 | B2 | * | 9/2006 | Britt, Jr. | 709/229 |
| 8,144,846 | B2 | * | 3/2012 | Gilbert et al. | 379/93.02 |
| 2003/0065934 | A1 | * | 4/2003 | Angelo et al. | 713/200 |
| 2004/0224665 | A1 | * | 11/2004 | Kokubo | 455/411 |
| 2005/0037736 | A1 | * | 2/2005 | Jung | 455/411 |
| 2005/0221800 | A1 | * | 10/2005 | Jackson et al. | 455/411 |
| 2008/0083982 | A1 | * | 4/2008 | Kelley et al. | 257/722 |
| 2008/0172744 | A1 | * | 7/2008 | Schmidt et al. | 726/26 |
| 2008/0180244 | A1 | * | 7/2008 | Howarth et al. | 340/568.1 |

* cited by examiner

Primary Examiner — Eleni Shiferaw
Assistant Examiner — Hilary Branske
(74) Attorney, Agent, or Firm — Woodcock Washburn LLP

(57) ABSTRACT

Systems, methods and computer readable media for remotely disabling communication devices. When a communication device is identified for disablement, a disable signal may be transmitted to the emergency communication device. If the emergency communication device receives the disable signal, the emergency communication device may authenticate the source of the disable signal. If the source of the disable signal has been authenticated, the emergency communication device may disable itself. Disablement may include physical destruction or physical alteration of hardware or software necessary for the communication device to operate. Disablement may also include being locked-out from access to or use of hardware or software necessary for the communication device to operate.

17 Claims, 4 Drawing Sheets

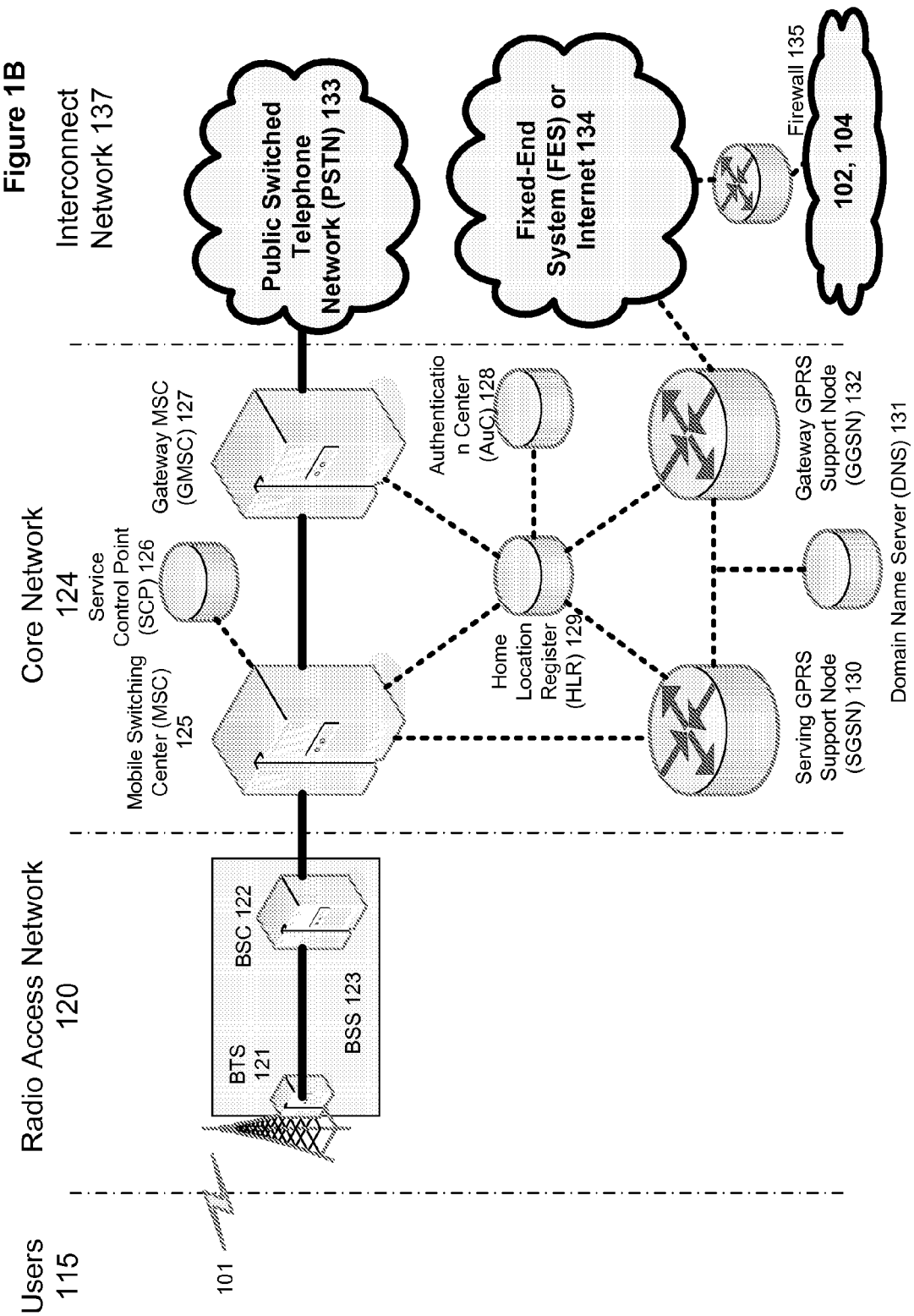

REMOTE DISABLEMENT OF A COMMUNICATION DEVICE

BACKGROUND

Emergency responders may include fire department personnel, police department personnel, emergency medical services personnel, HAZMAT teams and the like. Emergency responders use communication equipment to coordinate assistance and security during times of crisis, including fires, riots, terrorist attacks, chemical spills, etc. In an effort to make emergency communications more useful and reliable, steps are being taken to standardize the communication equipment used by emergency responders. For example, Project 25 (P25) is a standardization program managed by the U.S. Department of Homeland Security. A goal of the P25 program is to standardize emergency communication equipment.

Emergency communication equipment used by emergency responders is becoming more powerful, with features keeping pace with technology development in communications equipment generally. In addition, many of the emergency communication devices used by emergency responders are mobile devices.

Emergency communication equipment can pose a great risk if a malicious person were to obtain such equipment. For example, a terrorist may steal communications equipment from emergency responders or their vehicles. The mobile nature of some of the devices may make a theft easier to perpetrate. Once a terrorist has gained possession of an emergency communication device, the terrorist may then use the emergency communication device to hamper, track or otherwise use emergency services information for their own end.

Thus, there exists a need to protect society from the malicious use of emergency communication equipment. Although the present disclosure describes with particular reference and application to emergency communication devices, the claimed embodiments are not intended to be limited to emergency communication devices.

SUMMARY

The disclosed embodiments provide systems, methods and computer readable media for remotely disabling communication devices. Remote disablement of emergency communication devices may be needed for many reasons. For example, those responsible for emergency communication devices may want to disable emergency communication devices that are missing, stolen or being used for unauthorized activity.

When an emergency communication device is identified for disablement, a disable signal may be transmitted to the emergency communication device. If the emergency communication device receives the disable signal, the emergency communication device may authenticate the source of the disable signal. If the source of the disable signal has been authenticated, the emergency communication device may disable itself. For example, an emergency communication device may contain information in a processing/memory section. The emergency communication device may be unable to function without the information contained in the processing/memory section. In response to an authenticated disable signal, an emergency communication device may take steps such as destroy the information, erase the information, or deny access to the information, thus, disabling the emergency communication device.

BRIEF DESCRIPTION OF THE DRAWINGS

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific methods, systems and computer readable media disclosed.

FIG. 1B illustrates an exemplary emergency communication network.

DETAILED DESCRIPTION

Claimed embodiments are described herein with particular reference and application to emergency communication devices. However, the claimed embodiments have application to communication devices in general. Thus, the claims hereof are not intended to be limited to emergency communication devices.

Figure 1A:
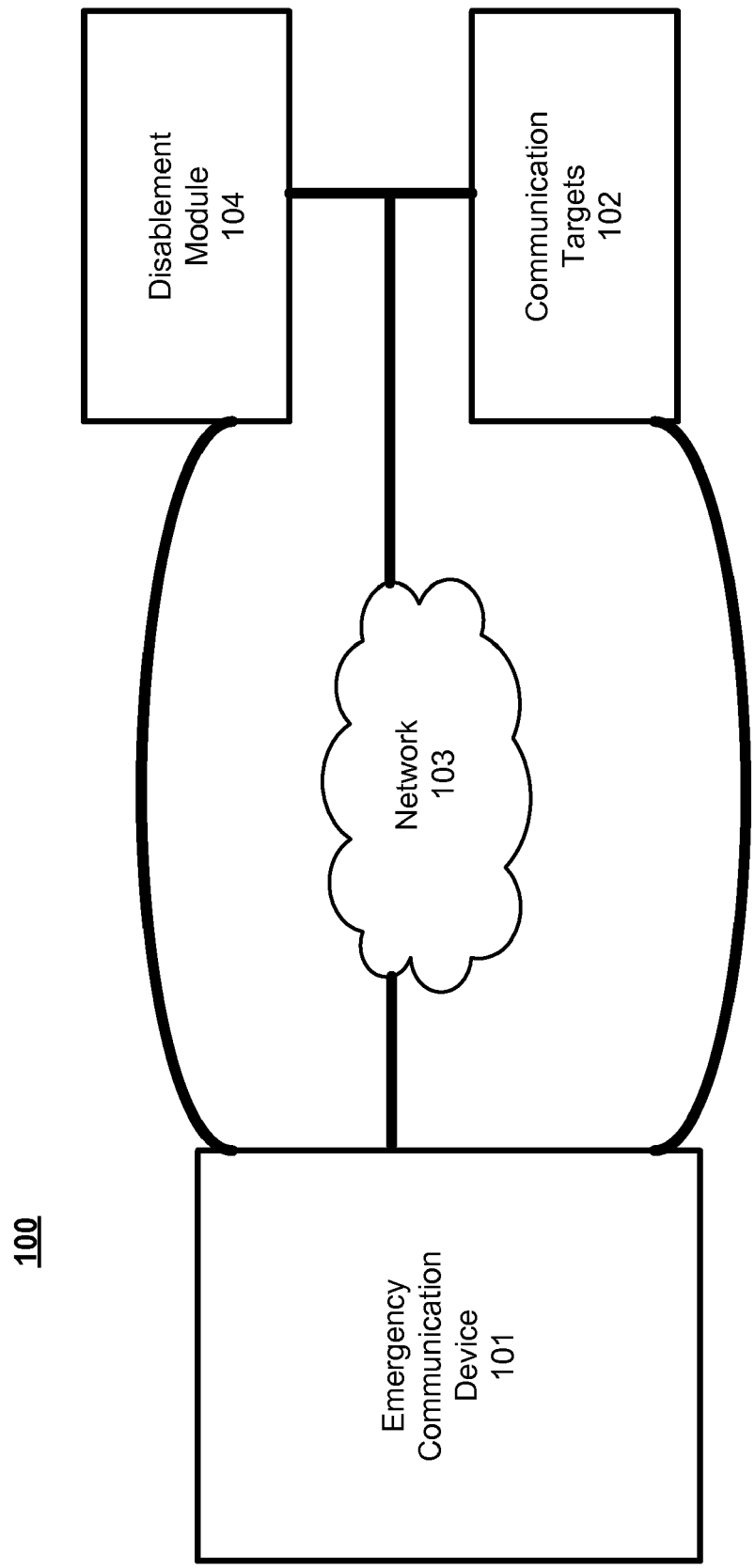
FIG. 1A illustrates an exemplary emergency communication system.

In order to remotely disable emergency communication devices, systems, methods and computer readable media are employed that may work through networks and systems used by emergency communication systems. FIG. 1A illustrates a basic exemplary emergency communication system 100 with which the claimed embodiments may be used. Emergency communication system 100 comprises emergency communication device 101, communications targets 102, network 103 and disablement module 104.

FIG. 1A depicts an emergency communication device 101. The emergency communication device 101 may comprise any type of communications device, including devices conformant with P25 standards. Examples of an emergency communication device 101 include a portable computer, a two-way radio, a portable phone, a personal digital assistant ("PDA"), a pager, a satellite phone, and the like, or, any combinations thereof. The emergency communication device 101 can communicate with other parts of the emergency communication system 100 by transmitting and/or receiving signals. The signals may be transmitted or received in any manner, including land lines, wireless signals, optical signals, and the like, or any combination thereof. Further, emergency communication device 101 may communicate via the network 103. In addition, emergency communication device 101 may communicate directly with any part of the emergency communication system 100, such as the communication targets 102 or the disablement module 104. Emergency communication device 101 may also communicate with other emergency communication devices directly or through network 103, communications targets 102, disablement module 104, or any combination thereof.

Communications targets 102 comprise communication targets with which the emergency communication device 101 may communicate or allow communication. Examples of communication targets 102 include police or other law enforcement personnel, EMT personnel, other emergency communication devices, emergency operation command centers, fire department personnel, HAZMAT personnel, other local, state or federal agents, and the like, as well as systems and devices associated with any of them.

Disablement module 104 may have the ability to cause disablement of emergency communication device 101. Before causing disablement, the disablement module 104 may identify or receive identification of an emergency communication device to be disabled. For example, disablement module 104 may be configured to detect when an emergency communication device 101 is being used in an unauthorized manner. As another example, disablement module 104 may receive instructions, from one or more of the communication targets 102 for instance, to disable the emergency communication device 101. In such cases, disablement module 104 may initiate a disablement of the emergency communication device 101, by sending a disable signal for example.

Any or all of the features of the disablement module 104 may be contained in other parts of the emergency communication system 100. For example, features related to disablement, such as those described in conjunction with the disablement module 104 may be contained in software on network 103, communications targets 102, systems and devices associated with any of them, or a combination thereof.

Communications between the parts of emergency communication system 100 may take place through network 103. FIG. 1B illustrates an architecture of an exemplary emergency communication network through which the present systems and methods may be implemented. However, FIG. 1B is not meant to limit network implementations that may be used in conjunction with the claimed embodiments. Communication network systems are well known in the art and any network implementation that may facilitate communications between parts of emergency communication system 100 may be used by the claimed embodiments.

The following information may help in understanding FIG. 1B. The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1B illustrates the architecture of a typical GPRS network as segmented into four areas: users 115, radio access network 120, core network 124 and interconnect network 137. The users area 115 may include a plurality of end users, including users of an emergency communication device 101. The radio access network 120 may include a plurality of base station subsystems such as the BSSs 123, which include Base Transceiver Stations (BTSs) 121 and Base Station Controllers (BSCs) 122. The core network 124 may include a host of various network elements. As illustrated here, the core network 124 may include a Mobile Switching Center ("MSC") 125, a Service Control Point ("SCP") 126, a gateway MSC 127, a Serving GPRS Support Node (SGSN) 130, a Home Location Register ("HLR") 129, an Authentication Center ("AuC") 128, a Domain Name Server ("DNS") 131 and a Gateway GPRS Support Node (GGSN) 132. The interconnect network area 137 also may include networks and network elements. As illustrated in FIG. 1B, the interconnect network 137 may include a Public Switched Telephone Network ("PSTN") 133, a Fixed-End System ("FES") and/or the Internet 134, a firewall 135 and/or communication targets 102 and the disablement module 104.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives transmission traffic, for example, from the BSC 122, it may send a query to a database hosted by the SCP 126. The SCP 126 may process the request and may issue a response to the MSC 125 so that it may continue processing received transmissions as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

In the following, depending on context, the term "emergency communication device subscriber" may refer to either the end user or to the actual device used by an end user of the emergency communication device. When an emergency communication device subscriber turns on an emergency communication device, the emergency communication device goes through an attach process by which the emergency communication device attaches to a SGSN of the GPRS network. Referring now to FIG. 1B, the emergency communication device subscriber may initiate the attach process by turning on the network capabilities of the emergency communication device. An attach request may be sent by the emergency communication device subscriber to the SGSN 130. The SGSN 130 may query another SGSN, to which the emergency communication device subscriber may have been attached before, for the identity of the emergency communication device subscriber. Upon receiving the identity of the emergency communication device subscriber from the other SGSN, the SGSN 130 may request more information from the emergency communication device subscriber. This information may be used to authenticate the emergency communication device subscriber to the SGSN 130 by the HLR 129. Once the emergency communication device subscriber is verified, the SGSN 130 may send a location update to the HLR 129 indicating the change of location to a new SGSN, in this case the SGSN at 130. The HLR 129 may notify the old SGSN, to which the emergency communication device subscriber was attached, to cancel the location process for the emergency communication device subscriber. The HLR 129 may then notify the SGSN 130 that the location update has been performed. At this time, the SGSN 130 may send an "Attach Accept" message to the emergency communication device subscriber, which in turn, may send an "Attach Complete" message to the SGSN 130.

After the attaching process, the emergency communication device subscriber may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the emergency communication device subscriber. The emergency communication device subscriber may use an algorithm to send the user identification (ID) and/or a password to the SGSN 130. The SGSN 130 may use the same algorithm to compare the result. If a match occurs, the SGSN 130 may authenticate the emergency communication device subscriber. The authentication process described in relation to FIG. 1B differs from the authentication process described in relation to FIG. 3 and FIG. 4.

Next, the emergency communication device subscriber may establish a user session with the destination network, for example, the communication targets 102 and/or the disablement module 104, by going through a Packet Data Protocol ("PDP") activation process. The emergency communication device subscriber may request access to the Access Point Name ("APN"), for example, fbi.gov, and the SGSN 130 may receive the activation request from the emergency communication device subscriber. The SGSN 130 may then initiate a Domain Name Service ("DNS") query to learn which GGSN node has access to the fbi.gov APN. The DNS query may be sent to the DNS server 131 within the core network 124 which may be provisioned to map to one or more GGSN nodes in the core network 124. Based on the APN, the mapped GGSN 132 may access the requested communication targets 102 and/or the disablement module 104. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the emergency communication device subscriber.

Once activated, data packets of the transmission made by the emergency communication device subscriber may then go through radio access network 120, core network 124, and interconnect network 137, to reach communications targets 102, disablement module 104, or both.

Figure 2:
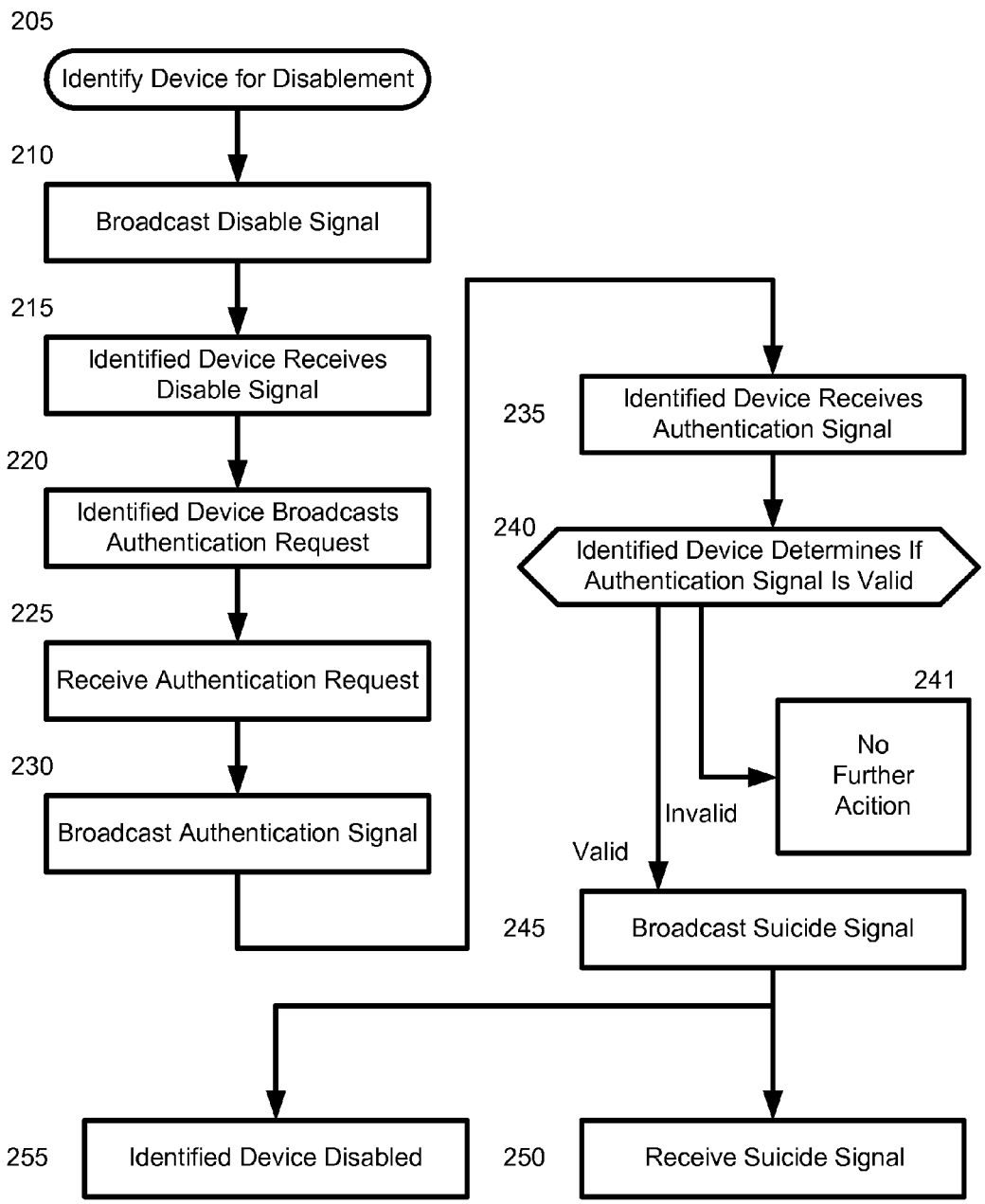
FIG. 2 illustrates an exemplary method for remotely disabling an emergency communication device

FIG. 2 illustrates an exemplary method for remotely disabling an emergency communication device. At 205, an emergency communication device may be identified for disablement. One example of a way to identify an emergency communication device for disablement is when one is found missing or stolen. Another way is when an unauthorized emergency communication device is attempting to access the emergency communication system. For example, an emergency communication device that is assigned to an EMT may be trying to access police channels to which the emergency communication device does not have access authorization. Also, someone may try to access the emergency communication network without a proper password. As another example, an emergency communication system may keep track of devices and take appropriate action. An emergency communication system may have information that a certain emergency communication device is assigned to an emergency responder that is currently on vacation or off-duty. If the emergency communication device of the vacationing or off-duty emergency responder attempts to access the emergency communication network, the emergency communication device may be identified for disablement.

One skilled in the art may realize that a system of unique addresses for each emergency communication device may aid in identification and disablement of emergency communication devices. For example, a unique address may allow a signal to be received only by a single device. Alternately, a signal may be capable of reception by all emergency communication devices, but screened from processing based on the unique address in the signal.

At 210, a component or components of an emergency communication system may broadcast a disable signal. For example, a fire department may have identified a radio that was stolen. Further, the fire department may cause a disable signal to be broadcast using the unique address of the radio that was stolen so that the disable signal may initiate disablement only on the stolen radio. At 215, the identified emergency communication device may receive the disable signal.

At 220, the identified emergency communication device may broadcast an authentication request. Requiring authentication may protect emergency communication devices from accidental or malicious disabling.

At 225, a component or components of an emergency communication system receives the authentication request. In response to the authentication request, at 230, a component or components of an emergency communication system may broadcast an authentication signal. The authentication signal may contain information, such as a code, that may confirm that the sender of the disable signal has proper authority to order a disablement. At 235, the identified emergency communication device may receive the authentication signal. At 240, the identified emergency communication device may confirm that the authentication signal is valid. If the authentication signal is not valid, no further action may be taken 241.

If the authentication signal is valid, at 245, the emergency communication device may broadcast a suicide signal. The suicide signal may contain information indicating that the emergency communication device received the authentication signal and will disable itself.

At 250, a component or components of an emergency communication system may receive the suicide signal from the identified emergency communication device. At 255, the identified emergency communication device disables itself. The identified emergency communication device may disable itself regardless of whether a component or components of an emergency communication system actually receives the suicide signal.

Figure 3:
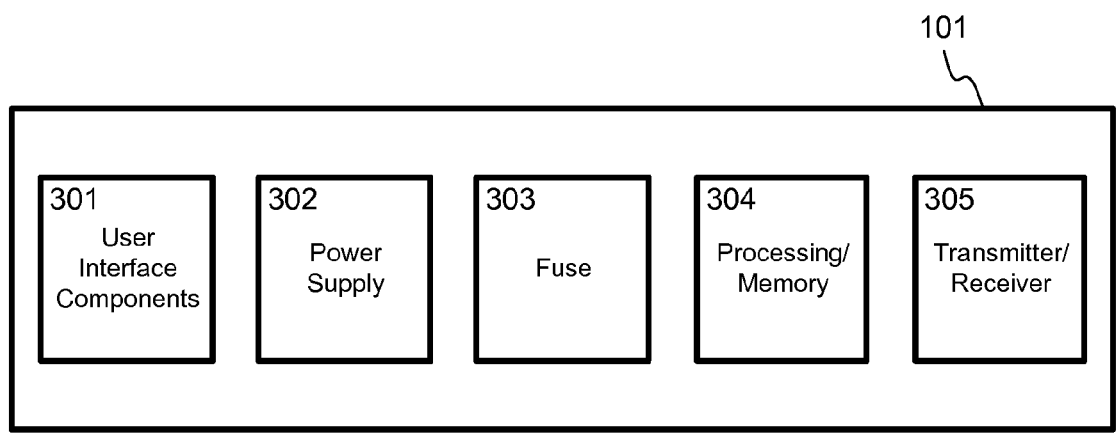
FIG. 3 illustrates exemplary systems to disable an emergency communication device.

FIG. 3 illustrates exemplary systems to implement disablement of an emergency communication device 101. Emergency communication device 101 may comprise user interface components 301, power supply 302, fuse 303, processing/memory 304 and transmitter/receiver 305. User interface components 301 may allow a person to use the emergency communication device 101 for its intended purposes. As one example, the emergency communication device 101 may be a two-way radio, and, the user interface components 301 may comprise a microphone, a speaker, buttons for accessing features of the two way radio, a visual display, and the like. As another example, the emergency communication device 101 may be a computer, in which case the user interface components 301 may comprise a keyboard, a display screen, means to control a cursor, such as a mouse, and the like.

The transmitter/receiver 305 may allow emergency communication device 101 to practice remote communications. For example, transmitter/receiver 305 may allow emergency communication device 101 to send/receive communications to/from the network 103, communication targets 102 and disablement module 104 illustrated in FIG. 1A.

The power supply 302 may comprise any appropriate source of power, including batteries, as well as AC or DC power. The emergency communication device 101 may also contain a fuse 303. The fuse 303 may be a fuse for electrical protection or for disablement purposes. For disablement purposes, the emergency communication device 101 may blow the fuse 303 to make the device inoperable. However, depending on the accessibility of fuse 303, the emergency communication device 101 may be able to be made usable again without much technical expertise. Thus, blowing fuse 303 as a sole measure of disablement may be suited to applications where controlling use is not critical, such as may be the case for commercial applications where an emergency communication device 101 may often be identified for disablement errantly. Alternately, blowing fuse 303 may be used as an additional disablement measure combined with other measures.

The emergency communication device 101 may also include processing/memory 304 that may comprise instructions. Instructions may include data, memory, instructions, and the like. Emergency communication device 101 may use processing/memory 304 components such as an EPROM, EEPROM, CPU, flash memory and the like, or any combination thereof. The processing/memory 304 enables operation of the emergency communication device 101 (i.e., the emergency communication device 101 cannot operate without the instructions provided by processing/memory 304).

The emergency communication device 101 may be configured so that any operation performed by emergency communication device 101 needs processing/memory 304 to be successful. For example, an emergency communication device 101 may need instructions such as those that may be included on an EEPROM, or may need to process information via a CPU or may need to store data in flash memory. The processing/memory 304 components may also enable operation by keeping information about the unique address of the emergency communication device 101 or codes necessary to access the network or communication targets. Further, the emergency communication device 101 may be designed so that the instructions are contained within processing/memory 304. Thus, if processing/memory 304 is disabled, there can be no access to the instructions associated with emergency communication device 101 by way of emergency communication device 101.

For disablement purposes, the emergency communication device 101 may disable processing/memory 304. There may be different degrees of disablement. At one extreme, disablement may comprise physical destruction of processing/memory 304, where the destruction cannot be reversed or bypassed. For example, emergency communication device 101 may apply destructive light, electricity, electromagnetic fields, or the like to the processing/memory 304. The destructive application destroys the processing/memory 304, and, because the emergency communication device 101 cannot operate without the processing/memory 304, the emergency communication device 101 is permanently disabled. Permanent disablement may be the best choice when an emergency communication device 101 is of high importance. For example, physical destruction may be appropriate when one may need to take action based on the assumption that the emergency communication device 101 can no longer be used without a replacement of hardware and the software contained on the hardware.

Processing/memory 304 may also be disabled in a non-permanent way. For example, disablement may leave the emergency communication device 101 unusable, but repairable. For example, emergency communication device 101 may apply non-destructive light, electricity, electromagnetic fields, or the like to the processing/memory 304. The non-destructive application may erase memory such as flash memory or an EEPROM. However, the device may be able to be repaired by reprogramming the processing/memory 304. This may be a less costly alternative to permanent disablement as reprogramming may be accomplished without the need to replace hardware.

Another example of non-permanent disablement would be to 'lockout' a user of the emergency communication device 101. In a lockout disablement, the emergency communication device 101 would lockout a user from being able to use a device, but allow it to be reset. For example, the processing/memory 304 may be rendered inactive except to ask the user for a password that may reactivate the processing/memory 304 upon proper entry. The lockout method may be easier to overcome than the other disablement methods. Thus, the lockout method may be appropriate for non critical communication equipment or applications that do not involve public safety, such as some commercial uses.

What is claimed:

1. A method comprising:
discovering an attempt by a project 25 compliant (P25) communication device that is authorized access to a first emergency system to access a second emergency system to which the P25 communication device has not been authorized access;
responsive to discovering the attempt, generating a disable signal;
providing the disable signal;
receiving an authentication request, wherein the authentication request is indicative of:
receipt of the disable signal by the P25 communication device; and
being provided by the P25 communication device;
responsive to receiving the authentication request, providing an authentication signal;
receiving a suicide signal, the suicide signal being indicative of:
receipt of the authentication signal by the P25 communication device;
being provided by the P25 communication device; and
the P25 communication device taking action to disable the P25 communication device, wherein the action comprises at least one of:
a first degree of disablement indicative of permanent disablement of the P25 communication device; or
a second degree of disablement indicative of a non-permanent disablement of the P25 communication device.

2. The method of claim 1, wherein:
permanent disablement comprises destroying memory in the unauthorized communication device; and
non-permanent disablement comprises blowing a fuse in the unauthorized communication device.

3. The method of claim 1, wherein disablement of the P25 communication device is reversible responsive to a password entered into the P25 communication device.

4. The method of claim 1, wherein:
the first emergency system comprises one of an Emergency Medical Technician (EMT) system and a police channel; and the second emergency system comprises the other of the EMT system and the police channel.

5. The method of claim 1, wherein the authentication signal comprises an indication that disablement of the P25 communication device is authorized.

6. The method of claim 1, wherein disablement of the P25 communication device is preventable responsive to a password entered into the P25 communication device.

7. A tangible computer-readable storage memory, the computer-readable storage memory not being a transient signal per se, the tangible computer-readable storage memory having stored thereon executable instructions that, when executed by a computer, cause the computer to perform operations comprising:
determining an attempt by a project 25 compliant (P25) communication device that is authorized access to a first emergency system to access a second emergency system to which the P25 communication device has not been authorized access;
responsive to determining the attempt, generating a disable signal;
providing the disable signal;
receiving an authentication request, wherein the authentication request is indicative of:
receipt of the disable signal by the P25 communication device; and being provided by the P25 communication device;
responsive to receiving the authentication request, providing an authentication signal;
receiving a suicide signal, the suicide signal being indicative of:
receipt of the authentication signal by the P25 communication device;
being provided by the P25 communication device; and
the P25 communication device taking action to disable the P25 communication device, wherein the action comprises at least one of:
a first degree of disablement indicative of permanent disablement of the P25 communication device; or
a second degree of disablement indicative of a non-permanent disablement of the P25 communication device.

8. The tangible computer-readable storage memory of claim 7, wherein disablement of the P25 communication device is reversible responsive to a password entered into the P25 communication device.

9. The tangible computer-readable storage memory of claim 7, wherein:
the first emergency system comprises one of an Emergency Medical Technician (EMT) system and a police channel; and the second emergency system comprises the other of the EMT system and the police channel.

10. The tangible computer-readable storage memory of claim 7, wherein the authentication signal comprises an indication that disablement of the P25 communication device is authorized.

11. The tangible computer-readable storage memory of claim 7, wherein disablement of the P25 communication device is preventable responsive to a password entered into the P25 communication device.

12. A device comprising:
memory comprising executable instructions;
a processor in communication with the memory, the processor configured to execute the instructions to perform operations comprising:
determining an attempt by a project 25 compliant (P25) communication device that is authorized access to a first emergency system to access a second emergency system to which the P25 communication device has not been authorized access;
responsive to determining the attempt, generating a disable signal;
providing the disable signal;
receiving an authentication request, wherein the authentication request is indicative of:
receipt of the disable signal by the P25 communication device; and
being provided by the P25 communication device;
responsive to receiving the authentication request, providing an authentication signal;
receiving a suicide signal, the suicide signal being indicative of:
receipt of the authentication signal by the P25 communication device;
being provided by the P25 communication device; and
the P25 communication device taking action to disable the P25 communication device, wherein the action comprises at least one of:
a first degree of disablement indicative of permanent disablement of the P25 communication device; or
a second degree of disablement indicative of a non-permanent disablement of the P25 communication device.

13. The device of claim 12, wherein:
permanent disablement comprises destroying memory in the unauthorized communication device; and
non-permanent disablement comprises blowing a fuse in the unauthorized communication device.

14. The device of claim 12, wherein disablement of the P25 communication device is reversible responsive to a password entered into the P25 communication device.

15. The device of claim 12, wherein:
the first emergency system comprises one of an Emergency Medical Technician (EMT) system and a police channel; and
the second emergency system comprises the other of the EMT system and the police channel.

16. The device of claim 12, wherein the authentication signal comprises an indication that disablement of the P25 communication device is authorized.

17. The device of claim 12, wherein disablement of the P25 communication device is preventable responsive to a password entered into the P25 communication device.

* * * * *